United States Patent
Kang et al.

(10) Patent No.: US 11,004,091 B2
(45) Date of Patent: *May 11, 2021

(54) METHOD AND APPARATUS FOR CONFIGURING NETWORK BETWEEN USERS IN COMMUNICATION SYSTEM

(71) Applicant: Samsung Electronics Co., Ltd., Gyeonggi-do (KR)

(72) Inventors: Seong-Woon Kang, Suwon-si (KR); Jae-Woo Ko, Uiwang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 328 days.

This patent is subject to a terminal disclaimer.

(21) Appl. No.: 15/677,997

(22) Filed: Aug. 15, 2017

(65) Prior Publication Data

US 2017/0345024 A1    Nov. 30, 2017

Related U.S. Application Data

(63) Continuation of application No. 13/312,420, filed on Dec. 6, 2011, now Pat. No. 9,767,466.

(30) Foreign Application Priority Data

Dec. 6, 2010   (KR) .................. 10-2010-0123237
Jan. 19, 2011  (KR) .................. 10-2011-0005209

(51) Int. Cl.
*G06Q 30/00*    (2012.01)
*G06Q 30/02*    (2012.01)
(Continued)

(52) U.S. Cl.
CPC ............ *G06Q 30/02* (2013.01); *G06Q 10/10* (2013.01); *G06Q 30/0631* (2013.01); *G06Q 50/01* (2013.01)

(58) Field of Classification Search
CPC .... G06Q 30/02; G06Q 10/10; G06Q 30/0631; G06Q 50/01
(Continued)

(56) References Cited

U.S. PATENT DOCUMENTS 7,571,121 B2    8/2009  Bezos et al.
2005/0203807 A1 9/2005  Bezos et al.
(Continued)

FOREIGN PATENT DOCUMENTS

KR  1020020063537 A  8/2002
KR  1020030046156 A  6/2003
(Continued)

OTHER PUBLICATIONS

Summons to attend oral proceedings for European Patent Application No. 11846721.6 dated Jun. 22, 2018; 7 pages.
(Continued)

*Primary Examiner* — Robert M Pond

(57) ABSTRACT

A method and apparatus configure a network between users in a communication system. In a server, the method includes receiving user information from a terminal for purchasing contents, storing information on a purchaser for each of a plurality of contents, and configuring the network including users who purchase identical contents. Accordingly, the network can be automatically configured between user terminals on the basis of a contents purchase history of the user terminal in the communication system.

17 Claims, 7 Drawing Sheets

(51) Int. Cl.
*G06Q 50/00* (2012.01)
*G06Q 10/10* (2012.01)
*G06Q 30/06* (2012.01)

(58) Field of Classification Search
USPC .................................................... 705/26, 27
See application file for complete search history.

(56) References Cited

U.S. PATENT DOCUMENTS

| | | | |
|---|---|---|---|
| 2008/0222295 A1* | 9/2008 | Robinson | G06Q 10/10 709/227 |
| 2008/0313172 A1* | 12/2008 | King | G06F 17/241 |
| 2009/0144075 A1 | 6/2009 | Flinn et al. | |
| 2009/0172127 A1 | 7/2009 | Srikanth et al. | |
| 2010/0306122 A1* | 12/2010 | Shaffer | G06Q 50/01 705/319 |

FOREIGN PATENT DOCUMENTS

| | | | |
|---|---|---|---|
| KR | 1020050058219 A | 6/2005 |
| KR | 1020060073579 A | 6/2006 |
| KR | 1020070086460 A | 8/2007 |
| KR | 1020080091045 A | 10/2008 |

OTHER PUBLICATIONS

European Patent Office, Result of consultation by telephone for Application No. EP 11846721.6, dated Oct. 26, 2018, 3 pages.

Decision to refuse a European Patent application dated Nov. 14, 2018 in connection with European Patent Application No. 11 846 721.6, 14 pages.

Bidwell, Percy W., "Imports in the American Economy", Foreign Affairs (pre-1986); Oct. 1945; 24, 000001; ProQuest Central, pp. 85-98, total 14 pages.

Classified ad 4—no title (May 29, 1852) New York Daily Times (1851-1857), 1 page.

Martin, Thomas, "Ancient Greece: from prehistoric to Hellenistic Times", Yale University, 1996. pp. 11-12, total 2 pages.

Anderson, Kevin, "Technology: Thinking inside the box: Software startup Boxee aims to bring web video to the living room, but its founder reveals it has had to battle content companies", The Guardian; London (UK), Oct. 8, 2009: 3. downloaded from ProQuestDirect on the Internet, May 8, 2017, 4 pages.

International Search Report dated Jul. 25, 2012 in connection with International Patent Application No. PCT/KR2011/009385, 5 pages.

Written Opinion of International Searching Authority dated Jul. 25, 2012 in connection with International Patent Application No. PCT/KR2011/009385, 3 pages.

Extended European Search Report dated May 2, 2014 in connection with European Patent Application No. 11846721.6, 6 pages.

Foreign Communication From a Related Counterpart Application, European Application No. 11846721.6, communication pursuant to Article 94(3) EPC, dated May 3, 2017, 6 pages.

Foreign Communication From a Related Counterpart Application, Korean Patent Application No. 10-2011-0005209, Notice of Patent Grant, dated Jul. 10, 2017, 5 pages.

* cited by examiner

METHOD AND APPARATUS FOR CONFIGURING NETWORK BETWEEN USERS IN COMMUNICATION SYSTEM

CROSS-REFERENCE TO RELATED APPLICATION(S) AND CLAIM OF PRIORITY

The present application is a continuation of U.S. patent application Ser. No. 13/312,420 filed Dec. 6, 2011, which is related to and claims the benefit under 35 U.S.C. § 119(a) of Korean Patent Application No. 10-2010-0123237 filed in the Korean Intellectual Property Office on Dec. 6, 2010 and Korean Patent Application No. 10-2011-0005209 filed in the Korean Intellectual Property Office on Jan. 19, 2011, the contents of each are incorporated herein by reference.

TECHNICAL FIELD

The present invention relates to a communication system. More particularly, the present invention relates to a method and apparatus for automatically configuring a network between user terminals in the communication system.

BACKGROUND

A social network is defined as a network that horizontally extends from a user on the basis of individual identities on the Internet. As a network configured by adding other people around 'me', the social network includes different features from the conventional community. The social network is well appreciated in social relationships in a sense that personal value evaluation and personal connections have a great effect on human life. Further, the social network has rapidly spread since it is a very useful tool for creating individual personal connections.

A social network service is provided in such a manner that a user inputs user information to register to a specific site, and thereafter configures a network of users by selecting users for making personal connections or by receiving a recommendation of another user.

However, the aforementioned method has a risk that user information may be leaked when the user inputs the user information to register to the site. Also, the user experiences inconvenience when directly selecting other users to configure the network. In addition, there is a problem in that even if a different user is recommended, whether the recommended user is a right person cannot be known since there is no correct information on the different user.

Recently, with the growing demand on contents that can be purchased by using a user terminal, contents to be provided to the user terminal also tend to increase. It becomes difficult for the user terminal to find desired contents from a contents server due to the rapid increase of the contents. Of course, for user convenience, the contents server may show the contents by classifying the contents according to content type or show the contents in a descending order of sales. However, there is a high possibility that this method is not suitable for users' preference or taste. Therefore, the user inconveniently checks for a large amount of contents one by one to purchase desired contents, which may decrease a user's purchase desire.

SUMMARY

To address the above-discussed deficiencies of the prior art, it is a primary object to provide at least the advantages described below. Accordingly, an aspect of the present invention is to provide a method and apparatus for automatically configuring a network between user terminals in a communication system.

Another aspect of the present invention is to provide a method and apparatus for automatically configuring a network between user terminals on the basis of a contents purchase history of the user terminal in a communication system.

Another aspect of the present invention is to provide a method and apparatus for configuring a network between user terminals without having to directly input user information in a communication system.

Another aspect of the present invention is to provide a method and apparatus for recommending contents to each user terminal on the basis of a network configured between user terminals in a communication system.

In accordance with an aspect of the present invention, a method of a server for configuring a network between users in a communication system is provided. The method includes receiving user information from a terminal for purchasing contents, storing information on a purchaser for each of contents, and configuring the network including users who purchase identical contents.

In accordance with another aspect of the present invention, an apparatus of a server for configuring a network between users in a communication system is provided. The apparatus includes a communication module for receiving user information from a terminal for purchasing contents, a storage unit for storing information on a purchaser for each of contents, and a controller for configuring the network including users who purchase identical contents.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged network. Exemplary embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. That is, the terms used herein are to be understood based on the descriptions made herein.

The present invention described below relates to a method and apparatus for automatically configuring a network between user terminals on the basis of a contents purchase history of the user terminal in a communication system. A communication terminal described below includes all terminals that can communicate with other devices, such as a mobile communication terminal, a Personal Computer (PC), a laptop, a netbook, and the like.

Figure 1:
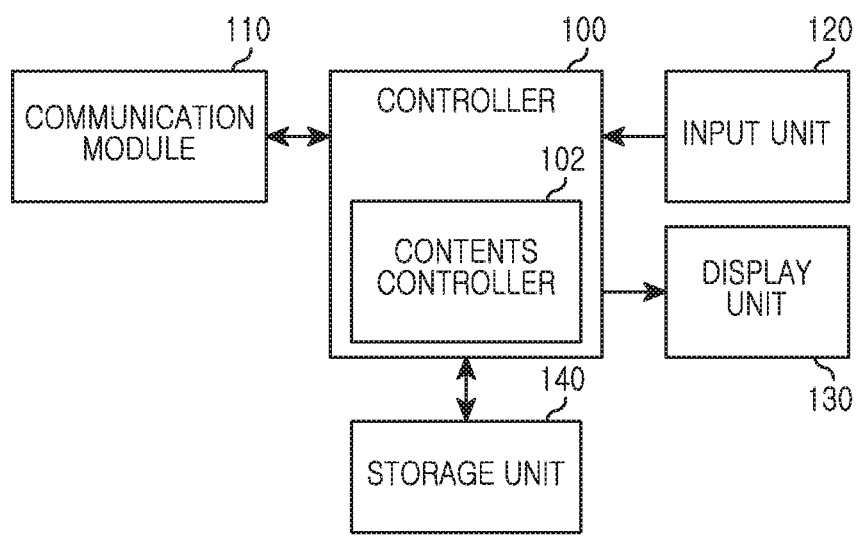
FIG. 1 is a block diagram of a communication terminal according to an embodiment of the present invention.

FIG. 1 is a block diagram of a communication terminal 101 according to an embodiment of the present invention.

Referring to FIG. 1, the communication terminal 101 includes a controller 100, a communication module 110, an input unit 120, a display unit 130, and a storage unit 140. The controller 100 includes a contents controller 102.

The controller 100 provides overall control to the communication terminal 101, and controls and processes a function for purchasing contents by accessing a contents server via the contents controller 102. That is, at the occurrence of a contents purchase event provided from the contents server based on a user's manipulation, the contents controller 102 provides the contents server with pre-stored user information to use a Social Network Service (SNS) based on the contents, and controls and processes a function for downloading the contents from the contents server. The contents controller 102 displays onto the display unit 130 a message that inquires whether to agree to use user information in order to use the SNS based on the contents to be purchased. Then, the contents controller 102 can receive information indicating whether the user agrees to use the information. The contents controller 102 can transmit the user information to the contents server only when the user agrees to use the information. That is, if the user does not agree to transmit the user information to the contents server, the contents controller 102 does not transmit the user information to the contents server, and the user cannot use the SNS based on the contents to be purchased.

When the downloaded contents are executed, the contents controller 102 controls a function to provide a menu that can use the contents-based SNS. For example, the contents controller 102 can control a function for receiving a user's opinion on the contents and transmitting the opinion to the contents server, or for receiving an opinion registered by other users who purchase the contents from the contents server and providing the opinion to the user via the display unit 130. Further, the contents controller 102 can control a function for receiving information on the SNS configured based on the contents from the contents server and for performing communication directly to other users belonging to the SNS.

The communication module 110 communicates with the contents server by using a predetermined communication rule under the control of the controller 100. That is, the communication module 110 accesses the contents server under the control of the controller 100, transmits a specific contents purchase signal and a signal including the user information to the accessed contents server, and receives the specific contents from the contents server and then provides the contents to the controller 100. Further, the communication module 110 transmits and receives a signal for using the contents-based SNS under the control of the controller 100.

The input unit 120 includes at least one key button or touch sensor, and thus receives data input from the user and provides the received data to the controller 100. That is, the input unit 120 includes a keypad including at least one of a numeric character, an alphabetical character, and a function key, and thus provides data corresponding to a key pressed by the user to the controller 100. The input unit 120 may also include a touch sensor and thus provide the controller 100 with data corresponding to a coordinate touched by the user. In one embodiment, according to the present invention, the input unit 120 can receive data for indicating purchasing of contents, and can receive an indication whether to agree to provide the user information to the contents server in order to use the contents-based SNS.

The display unit 130 displays a variety of state information, numeric characters, alphabetical characters, and images which are generated while the communication terminal is operating. In one embodiment, the display unit 130 can display a contents list that indicates contents provided from the contents server under the control of the controller 100, and can display a message for inquiring whether to agree to provide the user information to the contents server in order to use the SNS based on the contents to be purchased.

The storage unit 140 stores data and various programs for overall operations of the communication terminal, and stores user information and contents downloaded from the contents server. Herein, the user information may be information input by the user, and may be information obtained from a Subscriber Identification Module (SIM) card inserted into the communication terminal. For example, the user information may be information previously input by the user to use the SNS, and may be information obtained when the user information is input for a specific user account. Herein, the user information may include a variety of information (e.g., user identification (ID), nickname, age, gender, address, phone number, hobby, specialty, date of birth, occupation, and the like.)

Figure 2:
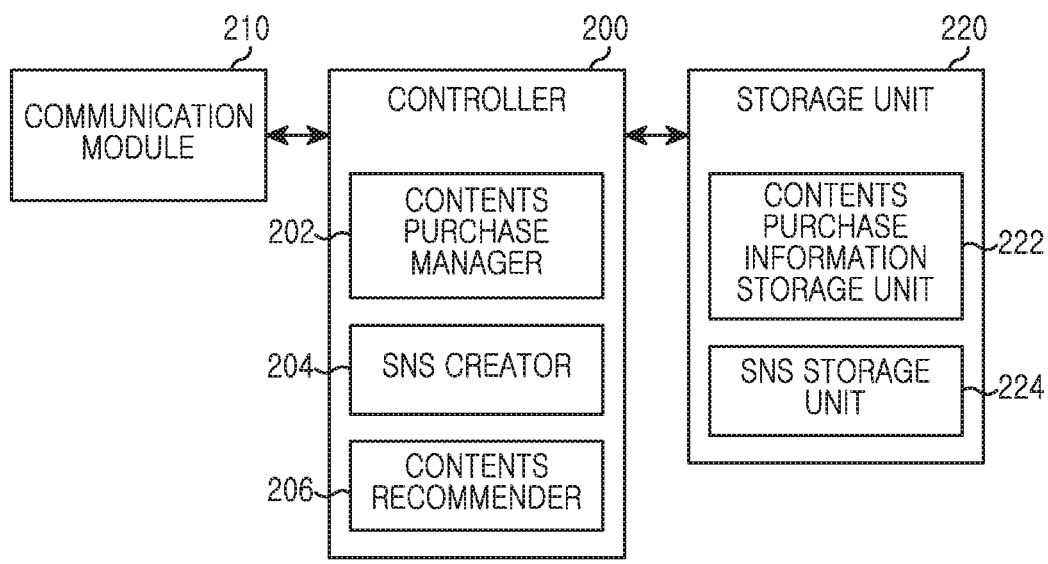
FIG. 2 is block diagram of a contents server according to an embodiment of the present invention.

FIG. 2 is block diagram of a contents server 201 according to an embodiment of the present invention.

Referring to FIG. 2, the contents server 201 includes a controller 200, a communication module 210, and a storage unit 220. The controller 200 includes a contents purchase manager 202, an SNS creator 204, and a contents recommender 206. The storage unit 220 includes a contents purchase information storage unit 222 and an SNS storage unit 224.

The controller 200 controls and processes an overall operation of the contents server 201. In one embodiment, the controller 200 collects purchaser information on each of one or more contents provided from the contents server 201 via the contents purchase manager 202, and controls and processes a function for configuring a network between users via the SNS creator 204 on the basis of the purchaser information on each of the contents.

Figure 5:
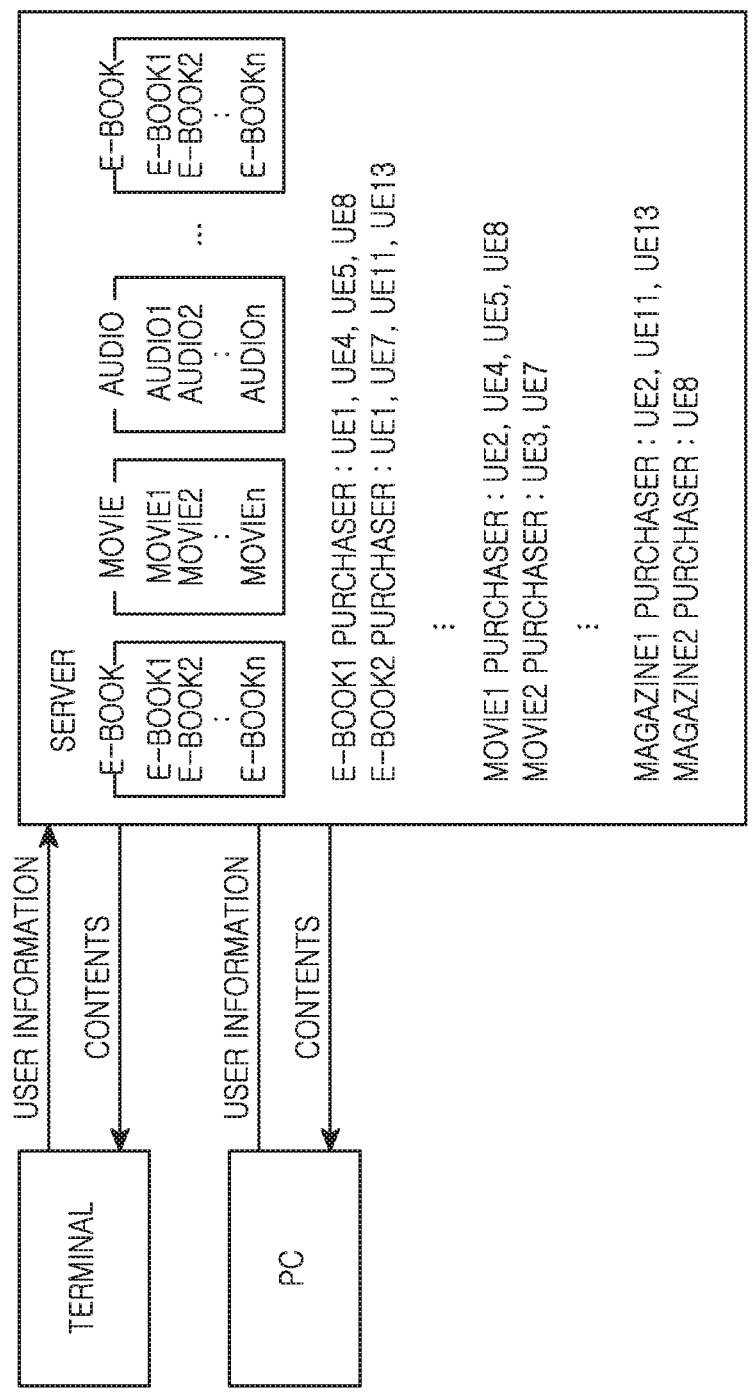
FIG. 5 illustrates purchaser information per contents stored in a contents server according to an embodiment of the present invention.

That is, upon receiving a purchase signal for specific contents from a terminal via the communication module 210, the contents purchase manager 202 transmits the specific contents to the terminal. The contents purchase manager 202 determines whether a signal including the user information is received from the terminal. Upon receiving the signal including the user information, the contents purchase manager 202 determines the received user information as the contents purchaser, and provides the user information to the storage unit 220. For example, as illustrated in FIG. 5, the contents purchase manager 202 collects user information on users (i.e., UE1, UE4, UE5, and UE8) who purchase e-book1 contents and stores the user information to the storage unit 220, and receives user information on users (i.e., UE1, UE7, UE11, and UE13) who purchase e-book2 contents and provides the user information to the storage unit 220.

Figure 6A:
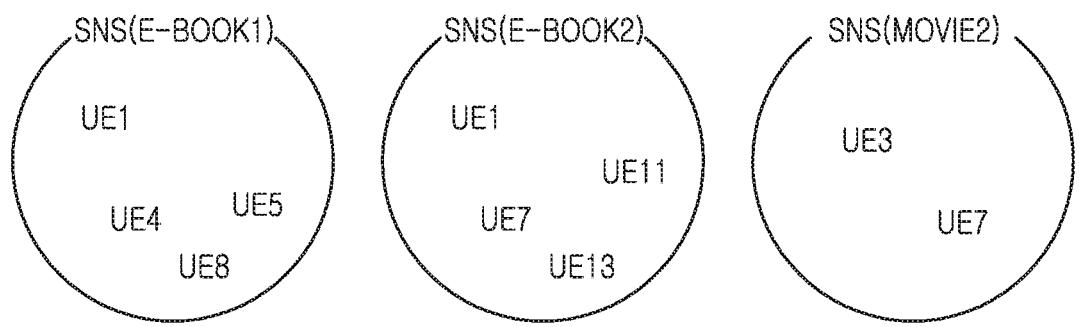
FIG. 6A and FIG. 6B illustrate examples of configuring a social network based on contents purchaser information in a contents server according to an embodiment of the present invention.
Figure 6B:
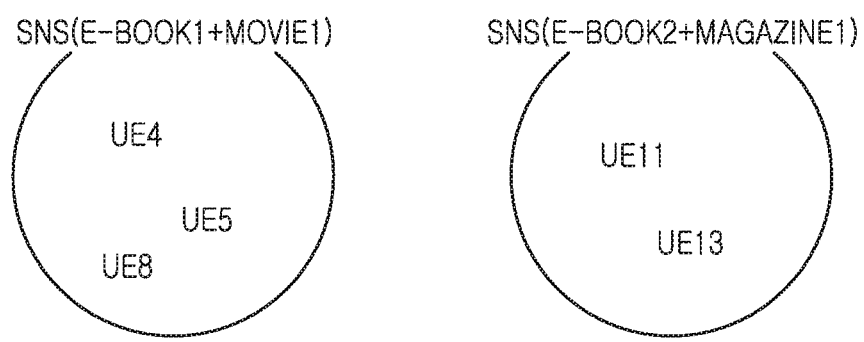

In addition, the SNS creator 204 controls and processes a function for configuring a contents-based user network by using purchaser information per contents stored in the contents purchase information storage unit 222 of the storage unit 220. That is, the SNS creator 204 configures one network between users who purchase at least one identical content, and stores information on the configured information to the SNS storage unit 224. The SNS creator 204 can configure the network between users who purchase one identical contents, and can configure the network between users who purchase a plurality of identical contents. For example, as illustrated in FIG. 6A, the network can be configured between users who purchase one identical content, and as illustrated in FIG. 6B, the network can be configured between users who purchase two identical contents. In addition, at the occurrence of a purchase event for specific contents, the SNS creator 204 controls and processes a function for updating a pre-configured network on the basis of the specific contents by receiving a list of users who purchase the specific contents from the storage unit 220. For example, the SNS creator 204 can configure users (i.e., UE1, UE4, UE5, and UE8) who purchase the e-book1 contents as one network group, and can configure users (i.e., UE4, UE5, and UE8) who purchase both the e-book1 contents and movie1 contents as one network group.

Further, when it is determined that the communication terminal is accessed via the communication module 210, the contents recommender 206 controls and processes a function for generating a contents recommendation list on the basis of a purchase history of the terminal. That is, the contents recommender 206 evaluates a network group including the accessed terminal, and controls and processes a function for generating a contents list to be recommended to the accessed terminal on the basis of the a purchase history of terminals belonging to the evaluated network group and for transmitting the generated contents list to the terminal. For example, the contents recommender 206 can evaluate contents purchased by other terminals belonging to the network group including the accessed terminal, and can determine a purchase ratio for each of the evaluated contents. Then, by selecting contents having a purchase ratio higher than a predetermined threshold, the contents recommender 206 can determine the selected contents as contents to be recommended for the accessed terminal. Further, the contents recommender 206 can select a specific number of contents in a descending order of the purchase ratio, and then can determine the selected contents as contents to be recommended for the accessed terminal. Herein, the purchase ratio of each of the contents implies a ratio of terminals that purchase each of contents to the terminals which belong to the network. For example, referring to FIG. 5 and FIG. 6, when the UE1 accesses to the server, the contents recommender 206 confirms that the UE1 purchases the e-book1 contents and the e-book2 contents and that the UE1 corresponds to two network groups, and also confirms that the UE4, UE5, and UE8 included in the network group of the e-book1 and the UE7, UE11, and UE13 included in the network group of the e-book2 purchase a movie1, a movie2, a magazine1, and a magazine2. In this embodiment, the movie1 is purchased by three users (i.e., UE4, UE5, and UE8), the magazine1 is purchased by two users (i.e., UE11 and UE13), and each of the movie2 and the magazine2 is purchased by one user (i.e., UE7 and UE8). Therefore, the contents recommender 206 can select the movie1 and the magazine1 in a descending order of the number of purchasers, i.e., in a descending order of the purchase ratio, and can recommend the selected one to the UE1.

The communication module 210 performs communication with the communication terminal by using a predetermined communication rule under the control of the controller 200. That is, the communication module 210 transmits a contents list to the terminal under the control of the controller 200, and receives a specific contents purchase signal and a signal including user information to the controller 200. Further, the communication module 210 transmits and receives a signal for providing a contents-based SNS to a terminal that purchases the contents under the control of the controller 200.

The storage unit 220 stores data and various programs for overall operations of the contents, and stores a plurality of contents. Further, the storage unit 220 stores purchaser information on each of the contents to the contents purchase information storage unit 222, and stores information on a user network configured based on contents into the SNS storage unit 224. For example, as illustrated in FIG. 5, the contents purchase information storage unit 222 can store information indicating that users who purchase the e-book1 contents are the UE1, UE4, UE5, and UE8, and can store information indicating that users who purchase the e-book2 contents are the UE1, UE7, UE11, and UE13. Further, under the control of the SNS creator 204, the SNS storage unit 224 can store the users (i.e., UE1, UE4, UE5, and UE8) who purchase the e-book1 contents as one network group as illustrated in FIG. 6A, and can store users (i.e., UE4, UE5, and UE8) who purchase both the e-book1 contents and the movie1 contents as one network group as illustrated in FIG. 6B.

Figure 3:
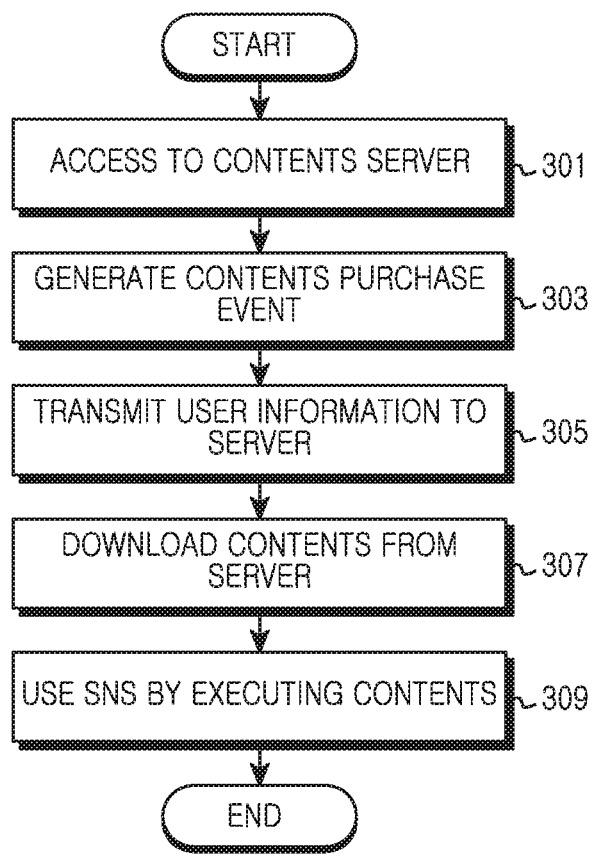
FIG. 3 is a flowchart illustrating a process of operating a communication terminal according to an embodiment of the present invention.

FIG. 3 is a flowchart illustrating a process of operating a communication terminal according to an embodiment of the present invention.

Referring to FIG. 3, the communication terminal accesses a contents server based on a user's manipulation in step 301, and generates a contents purchase event in step 303. That is, when the communication terminal accesses the contents server and displays contents provided from the contents server onto a screen, a user can generate an event for purchasing specific contents through a key button input or a screen touch.

The communication terminal transmits pre-stored user information to the contents server in step 305, and downloads the contents from the contents server in step 307. The communication terminal can display onto the screen a message for inquiring whether to agree to provide user information to the contents server in order to use an SNS based on contents to be purchased. Thereafter, the communication terminal can determine whether the user agrees to provide the user information under the control of the user, and can transmit the user information to the contents server only when the user agrees to do so. That is, if the user does not agree to transmit the user information to the contents server, the communication terminal does not transmit the user information to the contents server, and the user cannot use the SNS based on the contents to be purchased.

In step 309, the communication terminal can use the SNS by executing the contents based on the user's manipulation. For example, the communication terminal can receive a user's opinion on the contents and transmit the opinion to the contents server, or can receive an opinion registered by other users who purchase the contents from the contents server and then display the opinion onto the screen. Herein, the other users may be users who belong to a network configured on the basis of users who purchase the contents from the contents server, and in other words, may be users who purchase the same contents as that used in the communication terminal.

Although not shown in FIG. 3, the communication terminal may receive information on the SNS generated based on the contents from the contents server and then perform communication directly to the other users who belong to the SNS.

Figure 4:
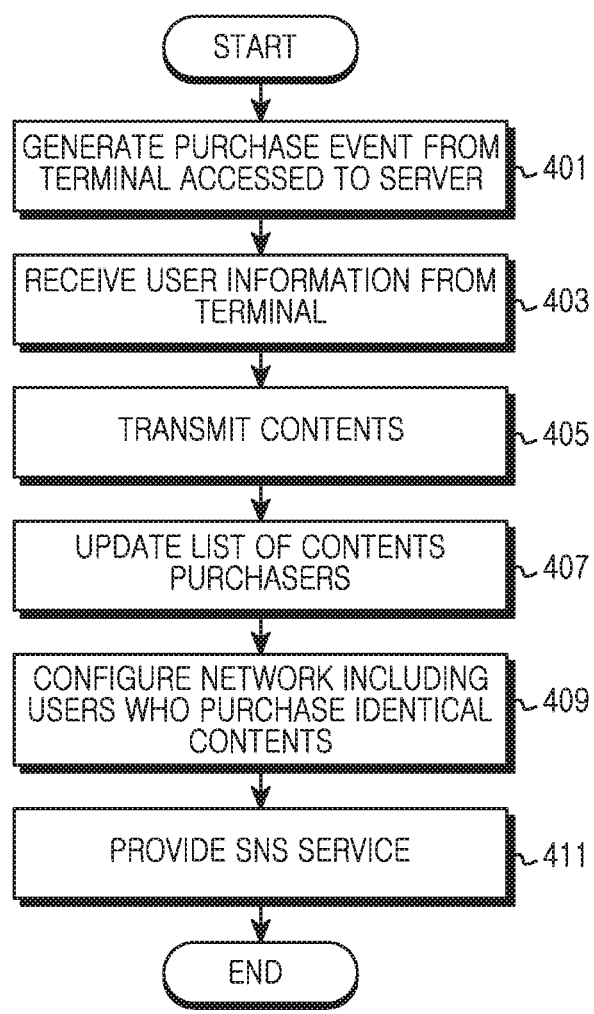
FIG. 4 is a flowchart illustrating a process of configuring a network of a contents server according to an embodiment of the present invention.

FIG. 4 is a flowchart illustrating a process of configuring a network of a contents server according to an embodiment of the present invention.

Referring to FIG. 4, the contents server determines whether an event for purchasing specific contents is detected from a terminal that accesses a server in step 401. Upon detection of the event for purchasing the specific contents, proceeding to step 403, the contents server receives user information from the terminal. Then, in step 405, the contents server transmits the specific contents to the terminal. Although not shown, if the terminal does not want to use an SNS based on the specific contents, instead of receiving the user information from the terminal, the contents server receives a signal indicating that a user does not agree to use the SNS and excludes the terminal from an SNS providing, i.e., a network configuring target, and transmits the contents to the terminal. Thereafter, the procedure of FIG. 4 ends. The terminal may agree to use an SNS for contents B even if the terminal does not agree to use an SNS for contents A. Therefore, the contents server may exclude the terminal from a network configuring target for the contents A, and may include the terminal to a network configuring target for the contents B. In addition, excluding of the terminal from the network configuring target for the contents A may mean that the terminal is not stored as a purchaser of the contents A.

The contents server that transmits the contents updates a list of users who purchase the specific contents in step 407. That is, the contents server adds user information received in step 403 to the pre-stored specific contents purchaser list, and thus stores the list of users who purchase the specific contents. For example, as illustrated in FIG. 5, the list of users who purchase e-book1 contents are UE1, UE4, UE5, and UE8, and that the list of users who purchase e-book2 contents are UE1, UE7, UE11, and UE13. In this embodiment, information on each user (e.g., user ID, nickname, age, gender, address, phone number, hobby, specialty, data of birth, occupation, and the like) is stored together.

Thereafter, the contents server configures a network including users who purchase identical contents in step 409. The contents server can configure the network between users who purchase one identical content, and can configure the network between users who purchase a plurality of identical contents. For example, as illustrated in FIG. 6A, users who purchase the e-book1 contents may be configured as one network, users who purchase the e-book2 contents may be configured as one network, and users who purchase the movie2 contents may be configured as one network. Further, as illustrated in FIG. 6B, users who purchase both the e-book1 contents and the movie1 contents may be configured as one network, and users who purchase both the e-book2 contents and the magazine1 contents may be configured as one network. In this embodiment, the contents server may configure users who purchase three or more identical contents as one network.

In step 411, the contents server provides an SNS on the basis of the network configured between users. For example, upon receiving a user's opinion from a communication terminal that purchases contents A, the contents server can transmit the received user's opinion to terminals of other users who belong to the network configured based on the contents A. In addition, the contents server can transmit information on the network configured based on the contents A to each UE that purchases the contents A.

Thereafter, the procedure of FIG. 4 ends.

Figure 7:
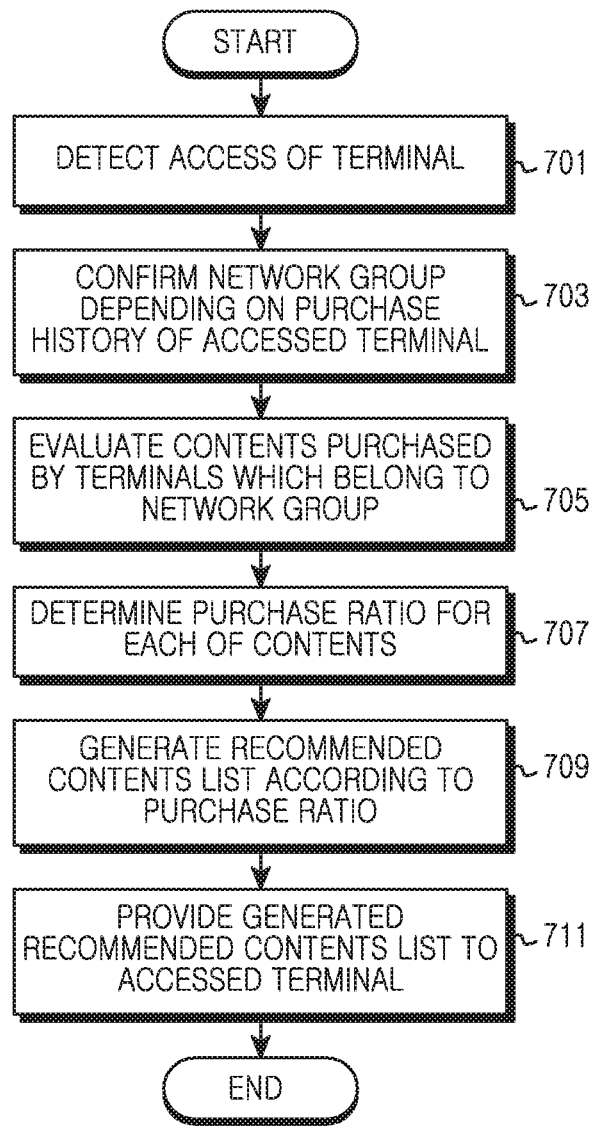
FIG. 7 is a flowchart illustrating a process of recommending contents of a contents server according to an embodiment of the present invention.

FIG. 7 is a flowchart illustrating a process of recommending contents of a contents server according to an embodiment of the present invention.

Referring to FIG. 7, if it is detected that a communication terminal accesses a server in step 701, proceeding to step 703, the contents server confirms a network group depending on a purchase history of the terminal of which the access is detected. That is, the contents server confirms the configured network group on the basis of contents which have been previously purchased by the terminal of which the access is detected. For example, referring to FIG. 5, if the communication terminal which accesses the server is UE1, the communication terminal confirms a network group (i.e., UE1, UE4, UE5, UE8) configured when the UE1 purchases an e-book1 and a network group (i.e., UE1, UE7, UE11, UE13) configured when the UE1 purchases an e-book2.

In step 705, the contents server evaluates contents purchased by other terminals that belong to a network group including the accessed terminal. In step 707, the contents server determines a purchase ratio for each of the evaluated contents. In step 709, the contents server generates a list including contents to be recommended to the accessed terminal according to the determined purchase ratio. Herein, the contents server can determine the purchase ratio for each of the evaluated contents and then generate a recommended contents list by selecting contents having a purchase ratio higher than a predetermined threshold. Alternatively, a certain number of contents can be selected in a descending order of the purchase ratio to generate the recommended contents list. For example, referring to FIG. 5, if the communication terminal that accesses the contents server is the UE1, the contents server confirms a network group (i.e., UE1, UE4, UE5, UE8) configured when the UE1 purchases the e-book1 and a network group (i.e., UE1, UE7, UE11, UE13) configured when the UE1 purchases the e-book2, and confirms that terminals (i.e., UE4, UE5, UE8) included in the network group of the e-book1 and terminals (i.e., UE7, UE11, UE13) purchase the movie1, the movie2, the magazine1, and the magazine2. In this embodiment, the server confirms that the movie1 is purchased by three terminals (i.e., UE4, UE5, UE8) and the magazine1 is purchased by two terminals (i.e., UE11 and UE13), and confirms that each of the movie2 and the magazine2 is purchased by one terminal (i.e., UE7 and UE8). Thereafter, the server can select the movie1 and the magazine1 in a descending order of the number of purchasers, i.e., in a descending order of the purchase ratio, and then can generate a list of contents to be recommended to the UE1.

In step 711, the contents server transmits the generated recommended contents list to the accessed communication terminal, and then the procedure of FIG. 7 ends.

According to exemplary embodiments of the present invention, a communication system automatically configures a network between user terminals on the basis of a contents purchase history of the user terminal. Therefore, a user can be prevented from directly inputting information, and a risk of leaking user information can be reduced. Further, purchasing of contents can be promoted, and a social network service can be activated. In addition, by recommending contents to each user terminal on the basis of a contents purchase history of user terminals which belong to the same network in the communication system, the present invention has an advantage in that even if the user does not additionally search for contents, contents suitable for user's preference and taste can be recommended, and consumption of new contents can be promoted while activating a social network service between users who own at least one identical contents.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. An apparatus of a server to configure a network group between client devices, the apparatus comprising:
   a communication module configured to receive user information from a client device, wherein the user information is associated with a user that has purchased content;
   a memory; and
   a processor coupled to the communication module and the memory;
   wherein the processor is configured to:
   in response to receiving the user information from the client device, configure the network group at least based on the received user information,
   in response to an opinion associated with a content being received from at least one of client devices of another user belonging to the network group, transmit the opinion to each of the client devices, including the client device of the user, wherein the network group is a group of the client devices that agree to use content-based Social Networking Service (SNS),
   in response to detecting an access of the client device:
      evaluate the network group based on the purchased content by the user associated with the accessed client device,
      determine one or more recommended content based on content purchased by other users which belong to the evaluated network group, and
      transmit a list including the one or more recommended content to the accessed client device,
   wherein the processor is further configured to:
   determine a purchase ratio for each of content purchased by the other users, and
   determine the one or more recommended content based on the purchase ratio, wherein the purchase ratio represents a rate of users that purchase corresponding content relative to all users that belong to the network group.

2. The apparatus of claim 1, wherein the processor is configured to:
   configure the network group of the corresponding content respectively, and
   configure the network group to include the client devices associated with users who purchase at least two identical content.

3. The apparatus of claim 1, wherein the communication module is configured to receive, from the client device, a signal indicating that the user of the client device does not agree to be included in the network group, and
   wherein the processor is configured to exclude the client device that transmits the signal from the network group.

4. The apparatus of claim 1, wherein after configuring the network group, the processor is configured to provide a communication service to client devices associated with users that belong to a same network group.

5. The apparatus of claim 4, wherein the processor is configured to transmit user information of the users that belong to the same network group to a client device of one of the users that belong to the same network group.

6. The apparatus of claim 1, wherein the processor is further configured to update a list of users who purchase a same content with the client device to add the user information in the memory.

7. A method implemented by a server to configure a network group between client devices, the method comprising:
   receiving, by the server, user information from the client device, wherein the user information is associated with a user that has purchased content;
   configuring, by the server, the network group at least based on the received user information;
   in response to an opinion associated with a content being received from at least one of client devices of another user belonging to the network group, transmitting, by the server, the opinion to each of the client devices, including the client device of the user, in the network group; and
   in response to detecting an access of the client device:
      evaluating the network group based on the purchased content by the user associated with the accessed client device;
      determining one or more recommended content based on content purchased by other users that belong to the evaluated network group, wherein the determining comprises:
         determining a purchase ratio for each of the content purchased by the other users; and determining the one or more recommended content based on the purchase ratio,
wherein the purchase ratio represents a ratio of users that purchase corresponding content relative to all users that belong to the network group,
transmitting a list including the one or more recommended content to the accessed client device,
wherein the network group is a group of the client devices that agree to use content-based Social Networking Service (SNS).

8. The method of claim 7, wherein configuring the network group comprises:
configuring the network group of the corresponding content respectively; and
configuring the network group to include the client devices associated with users who purchase at least two identical content.

9. The method of claim 7, further comprising:
receiving, from the client device, a signal indicating that the user of the client device does not agree to be included in the network group; and
excluding the client device, which transmits the signal, from the network group.

10. The method of claim 7, further comprising:
after configuring the network group, providing a communication service to client devices associated with users that belong to a same network group.

11. The method of claim 10, wherein providing the communication service comprises transmitting user information of the users that belong to the same network group to one of the client devices associated with one of the users that belong to the same network group.

12. The method of claim 7 wherein the opinion is inputted on content executed by a specific client device and transmitted to the server.

13. The method of claim 7, further comprising:
updating a list of users who purchase a same content with the client device to add the user information in a memory of the server.

14. An apparatus of a client device, the apparatus comprising:
a display;
a communication module; and
a processor coupled to the display and the communication module; wherein the processor is configured to:
in response to accessing a server, display a list including one or more recommended content provided by the server, on the display,
wherein the list is based on a purchase ratio for each of content purchased by other users that belong to a network group configured by the server and including the client device, wherein the purchase ratio represents a rate of users that purchase corresponding content relative to all users that belong to the network group configured by the server, and
wherein the network group is a group of client devices that agree to use content-based Social Networking Service (SNS),
in response to detecting a user input for purchasing at least one of the one or more recommended content, display, on the display, a user agreement comprising an agreement to use user information of a user of the client device in order to use the SNS based on the contents being purchased and downloading the at least one of the one or more recommended content from the server,
in response to the user's agreement to use the user's information,
transmit user information associated with the user of the client device to the server according to the user's agreement, provide content-based SNS based on the network group, and
receive, from the server, an opinion of another user in the network group, wherein the opinion is associated with the content, and transmitted to the server by at least one client device of the other user in the network group, and wherein the opinion is received in response to the server receiving the opinion from the at least one client device of the other user.

15. The apparatus of claim 14, wherein the processor is configured to:
transmit a first opinion for the content received from the user to the server, and
receive and display a second opinion registered by other users in the server.

16. The apparatus of claim 15, wherein the processor is further configured to:
display on the display a message for inquiring whether to agree to provide user information to the server in order to use the content-based SNS based on content to be purchased,
determine whether the user agrees to provide the user information, and
in response to the user's agreement, transmit the user information to the server.

17. The apparatus of claim 15, wherein the processor is further configured to:
receive another user information of at least one client device belong to the network group from the server, and
perform communication directly to the at least one client device based on the other user information.

* * * * *